United States Patent [19]

Shen

[11] Patent Number: 4,702,317
[45] Date of Patent: Oct. 27, 1987

[54] STEAM FOAM FLOODS WITH A CAUSTIC AGENT
[75] Inventor: Chin W. Shen, Houston, Tex.
[73] Assignee: Texaco Inc., White Plains, N.Y.
[21] Appl. No.: 902,542
[22] Filed: Sep. 2, 1986
[51] Int. Cl.⁴ .............................................. E21B 43/24
[52] U.S. Cl. .................... 166/272; 166/273; 166/303
[58] Field of Search ................ 166/272–275, 166/303, 309; 252/8.554; 175/69

[56] References Cited
U.S. PATENT DOCUMENTS

| 4,086,964 | 5/1978 | Dilgren et al. | 166/272 |
| 4,502,541 | 3/1985 | Lawson et al. | 166/275 |
| 4,532,993 | 8/1985 | Dilgren et al. | 166/309 X |
| 4,540,049 | 9/1985 | Hawkins et al. | 166/272 |
| 4,540,050 | 9/1985 | Huang et al. | 166/272 |
| 4,556,107 | 12/1985 | Duerksen et al. | 166/272 |
| 4,607,700 | 8/1986 | Duerksen et al. | 166/303 |
| 4,609,044 | 9/1986 | Lau | 166/272 X |

Primary Examiner—George A. Suchfield
Attorney, Agent, or Firm—Jack H. Park; Kenneth R. Priem; Harold J. Delhommer

[57] ABSTRACT

Disclosed is a process of adding a caustic material to a steam foam composed of steam, foaming agent and a non-condensible gas to increase the resistance and lifetime of a steam foam, said caustic agent selected from the group consisting of sodium carbonate, sodium bicarbonate, potassium carbonate, sodium hydroxide, potassium hydroxide, ammonium hydroxide, sodium silicate, and sodium orthosilicate.

21 Claims, 1 Drawing Figure

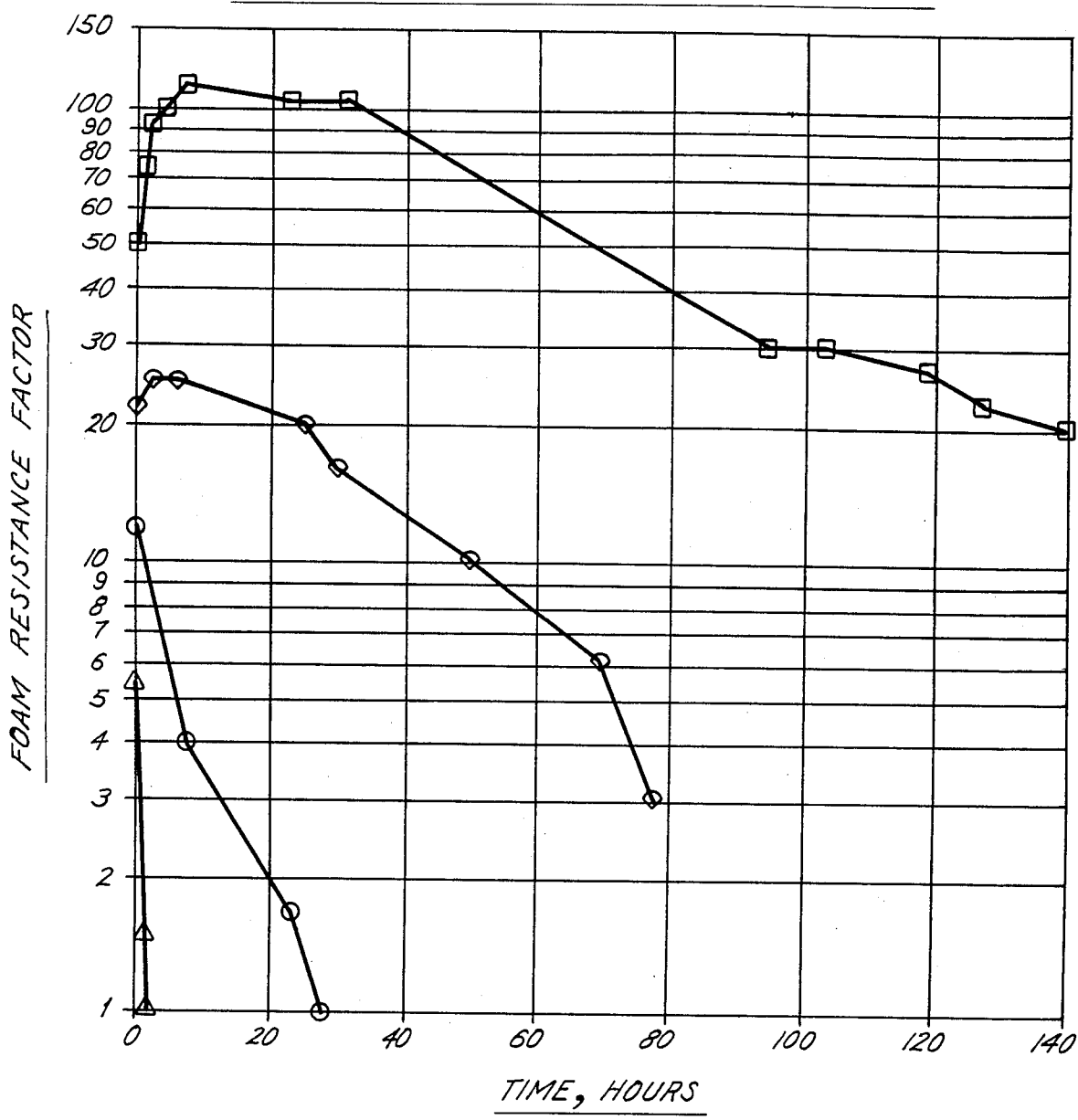

4,702,317

STEAM FOAM FLOODS WITH A CAUSTIC AGENT

BACKGROUND OF THE INVENTION

The present invention relates to steam foam floods. More particularly, the invention concerns the addition of a caustic agent such as sodium carbonate to steam foam floods.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injections rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. For these reasons, vertical conformance in steam floods is usually poor.

It has long been the concern of the oil industry to improve the vertical conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are not deemed acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The foaming agents of the prior art require the injection of a non-condensable gas to generate the foam in conjunction with the injection of steam and the foaming agent. U.S. Pat. Nos. 3,366,175 and 3,376,924 disclose the injection of a steam foam in a hydrocarbon reservoir at the interface between the hydrocarbons and the gas cap to aid in recovery. U.S. Pat. Nos. 3,410,344 and 3,994,345 disclose the use of a steam foaming agent selected from the generic groups of polyethoxyalkanols and alkylaryl sulfonates to reduce permeability in steam channels. The use of similar surfactants such as sodium lauryl sulfoacetate and alkyl polyethylene oxide sulfate are disclosed as foaming agents in carbon dioxide foams in U.S. Pat. Nos. 4,088,190 and 4,113,011, respectively. U.S. Pat. No. 4,018,278 discloses the use of sulfonated, ethoxylated alcohols or alkylphenols in surfactant flooding solutions without the use of steam.

Several trademarked foaming agents have been field tested by petroleum companies in steam floods. These include such trademarked chemicals as Stepanflo 30 sold by Stepan Chemical Co., Suntech IV sold by Sun Oil, Thermophoam BWD sold by Farbest Co. and COR-180 sold by Chemical Oil Recovery Co. Sodium chloride has also been tested as an additive to improve steam foam floods.

U.S. Pat. No. 4,086,964 discloses the use of lignin sulfonates for a foaming agent and 4,393,937 discloses the use of alpha olefin sulfonates as a steam foaming agent. See also United Kingdom Pat. No. 2,095,309 for a disclosure of alpha olefin sulfonate foaming agents.

Disclosures of laboratory and field tests of Stepanflo are contained in SPE Paper No. 10774 entitled "The Laboratory Development and Field Testing of Steam/Non-condensible Gas Foams for Mobility Control in Heavy Oil Recovery" by Richard E. Dilgren et al. presented at the 1982 California Regional Meeting of the SPE held in San Francisco Mar. 25-26, 1982 and the Journal of Petroleum Technology, July 1982, page 1535 et seq. The same Journal of Petroleum Technology also discusses tests conducted on Thermophoam BWD. Additional information on tests of Thermophoam BWD are also disclosed in Department of Energy Publications DOE/SF-10761-1, -2 and -3.

Tests of the COR-180 foaming agent of Chemical Oil Recovery Co. are disclosed in SPE Paper No. 11806 entitled "Improvement in Sweep Efficiencies in Thermal Oil-Recovery Projects Through The Application of In-Situ Foams" by R. L. Eson, presented at the International Symposium on Oil Field and Geothermal Chemistry in Denver, June 1-3, 1983 and Department of Energy Reports Nos. DOE/SF/10762-1, -2 and -3.

Copending U.S. patent application Ser. No. 772,115 now U.S. Pat. No. 4,660,641, filed Sept. 3, 1985 discloses the injection of steam along with an alkaline material such as sodium hydroxide, sodium silicate or sodium orthosilicate and a "buffering agent" such as sodium carbonate. The application requires that the alkaline agent and the buffering agent be injected with the steam in a critical concentration ratio such that the pH of the injected flood changes slowly as the alkaline earth hydroxide is absorbed from the aqueous solution by the formation matrix.

BRIEF DESCRIPTION OF THE DRAWINGS

FIG. 1 is a graph showing the foam resistance factor of several steam foams versus the lifetime of the steam foams.

SUMMARY OF THE INVENTION

The present invention is a process for recovering hydrocarbons by the use of a steam foam flood. It has been discovered that the addition of a caustic material to a steam foam substantially increases the resistance and lifetime of a steam foam. The invention is applicable wherever steam foams may be employed to lower the permeability of steam swept areas and increase formation conformance.

The invention comprises injecting into a well a mixture of steam, foaming agent, non-condensible gas, and a caustic agent selected from the group consisting of sodium carbonate, sodium bicarbonate, potassium carbonate, sodium hydroxide, potassium hydroxide, ammonium hydroxide, sodium silicate, and orthosilicate. It is believed that the addition of the caustic material increases the lifetime and resistance of steam foams regardless of the steam foaming agent employed to create the foam in conjunction with a non-condensible gas and steam.

DETAILED DESCRIPTION

Perhaps the greatest problem with steam flood processes a lack of vertical and horizontal conformance in the hydrocarbon reservoir. Like all injected fluids, steam tends to follow the paths of least resistance and greatest permeability in the direction of flow through the reservoir. And since most reservoirs have considerable variations in permeability, large amounts of hydrocarbons are left unrecovered by steam in the reservoir.

The problem of steam flood conformance is further aggravated by the creation of steam override zones. After steam has traveled the path of least resistance to a production well and removed hydrocarbons from that path, that path has even greater permeability. Eventually, this path will take all of the steam being injected to create a steam override zone, leaving large areas of high oil saturation in the formation.

Steam foams are one of the solutions developed by the petroleum industry to deal with the conformance problem. The present invention substantially improves the performance of steam foams by adding about 0.01% to about 10% by weight of steam in the injected mixture, preferably about 0.05% to about 2% by weight of a caustic agent to the steam foam mixture. The caustic agent is preferably sodium carbonate, but may also be sodium bicarbonate, potassium carbonate, sodium hydroxide, potassium hydroxide, ammonium hydroxide, sodium silicate, and sodium orthosilicate.

The caustic agent is injected into the formation along with the steam foam mixture, which contains steam, about 5 cubic feet to about 10,000 cubic feet of a non-condensible gas per barrel of steam (cold water equivalent) in the injected mixture, preferably about 10 cubic feet to about 2000 cubic feet of non-condensible gas per barrel of steam and about 0.01% to about 10% by weight of a foaming agent, preferably about 0.05% to about 5%, based upon the weight of steam in the injected mixture. The injected steam in the foam mixture may have any steam quality. The use of low quality steam in steam floods is becoming more prevalent for economic reasons.

The invention is expected to benefit any process in which a steam foam is employed to enhance conformance. The invention may be employed where a steam foam is injected into an injection well in conjunction with a steam flood to sweep hydrocarbons towards a production well from which hydrocarbons and other fluids are recovered.

The invention may also be employed when a steam foam is injected into a single well in conjunction with a cyclic steam process wherein hydrocarbons are produced from the same well that served as the injection well for the steam in the steam foam. After the injection of the steam foam mixture, the well is shut-in for a period of at least one day prior to producing the well to recover hydrocarbons and other fluids. Steam may be injected into the well before the injection of the foam mixture, after the injection of the foam mixture and before shutting in the well, and before and after the injection of the foam.

Third, the foam mixture may also be injected into a production well to improve formation conformance around the production well in conjunction with a steam flood coming towards the production well from an injection well. In this case, the steam front will normally be initiated by injection through an injection well prior to injection of the caustic agent foam mixture into the production well. Preferably, the foam will be injected through the production well immediately prior to steam breakthrough at the production well or after steam breakthrough because of the limited life of the foam when compared to the period required for the steam front to reach the production well after injection.

It is believed that the addition of an invention caustic agent to a steam foam mixture will substantially improve the foam properties of a steam foam regardless of the steam foaming agent employed to create the foam in conjunction with the non-condensible gas and steam. Examples of foaming agents with which the present invention can be practiced are: COR 180B ®, a trademarked oxyethylene sulfate steam foaming agent sold by Chemical Oil Recovery Co.; Stepanflo ® 20, Stepanflo ® 30 and Stepanflo ® 1390, trademarked alpha olefin sulfonates sold by Stepan Chemical Co; Thermophoam ® BWD, a trademarked alpha olefin sulfonate sold by Farbest Co.; Bioterge ® AS-40, a trademarked alpha olefin sulfonate sold by Stepan Chemical Co.; Suntech ® IV, a trademarked sulfonate steam foaming agent sold by Sun Oil Co; Igepal ® CA 720, a trademarked alkyl phenoxy polyoxyethyelene ethanol sold by GAF Corp.; Siponate ® 301-10, a trademarked alpha olefin sulfonate sold by Alcolac Co.; and Alcolac ® A-168, a trademarked steam foaming agent sold by Alcolac Co. The invention may also be employed with the alkoxylated alkyl sulfonates and alkoxylated alkylaryl sulfonates disclosed as steam foaming agents in U.S. Pat. No. 4,540,050. This should not be considered an exclusive list of foaming agents with which the present invention can be practiced.

In some cases, it will be economical to recover the non-condensible gas from the produced fluids and recycle that gas for reinjection with additional steam foam into the reservoir through the same or different injection wells. It may also be economically feasible to recover the foaming agent from produced fluids for recycle.

The mixture of steam, non-condensable gas, caustic agent, and foaming agent can bring about a substantial reduction in permeability when injected at almost any time into the high permeability areas of the formation. Vertical conformance will be significantly improved whether the caustic agent and foam mixtures are injected into the formation at the very beginning of steam injection, before steam breakthrough at the production well or after steam breakthrough. Steam may also be injected after the injection of the foam mixture. The most preferred injection times occur shortly after steam injection has begun and before steam breakthrough will occur at the production wells. In the first instance, the injection of the steam foaming agent and gas near the beginning of steam injection will help prevent narrow steam channels from being formed and extended through to the production wells. The injection of the foaming agent prior to steam breakthrough will postpone the time of steam breakthrough and spread the steam over a wider area near the production wells.

The invention will also work quite well if steam breakthrough occurred in the past and low oil saturation steam override zones exist. But in such a situation, the caustic agent and foam mixture should be injected in larger concentrations and greater quantities to reduce permeability in a frequently swept area. Generally, the mixture of steam, gas and foaming agent must be injected into the reservoir at a higher pressure than the previous injection of steam so that the foam will move a sufficient distance into the high permeability areas. However, the injection pressure must be less than the reservoir fracturing pressure or damage to the formation will occur.

Another steam foam injection process is to first inject the foam mixture for a sufficient time and then inject only steam. The cycle may be repeated for several cycles. Of course, the steam foam mixture may be injected continuously for the duration of the steam flood. Continuous injection will normally be effective with a lower concentration of foaming agent and caustic agent than the above cyclic injection process.

The foaming agent, caustic agent and gas may be injected into the formation without the concurrent injection of steam, provided that steam is injected into the formation prior to and after the injection of the foaming agent, caustic agent, caustic agent and gas. But preferably, the steam is coinjected with the foaming agent and gas.

A higher concentration of foaming agent is generally necessary if the region has been swept by steam for a considerable time. A different concentration of caustic agent may also be necessary. But individual tests should be run to tailor the concentration of the foaming agent and caustic agent in steam as the increased effectiveness of the foaming agent and caustic agent per increased concentration of foaming agent quickly reaches a point of diminishing economic returns. Furthermore, other surfactants may also be included in the steam, foaming agent and caustic agent mixture to increase oil recovery providing they do not substantially inhibit the foam.

In general, the non-condensable gas used in the foam mixture of the present invention can comprise substantially any gas which (a) undergoes little or no condensation at the temperatures and pressures at which the foam mixture is subjected, and (b) is substantially inert to and compatible with the foaming agent, the caustic agent, and other components of that mixture. Such a gas is preferably nitrogen but can comprise other substantially inert gases, such as air, ethane, methane, flue gas, fuel gas, or the like.

Two conditions will be prevalent in a steam override zone, especially in a well developed override zone. The steam flux in the override zone will be high relative to other portions of the reservoir because the vast majority of the steam will be passing through the override zone. In addition, the residual oil saturation in the override zone will be relatively low due to continuous steam flooding.

One of the most desirable attributes of a good steam foam is that it will work best in a low oil saturation area and at a high steam flux. It is believed that all of the disclosed caustic agents work well under these conditions of a high steam flux to increase the foam resistance factor and lengthen foam life.

No chemical or physical deterioration has been detected in the foams containing caustic agents tested at steam injection temperatures. In fact, foam lifes have been substantially increased by factors of two or more along with an increase in the all important foam resistance factor by a multiple of ten or more. The foams tested have continued to be effective for up to six or more days with the addition of a caustic agent such as sodium carbonate. But since the caustic agent and foaming agent will be eventually produced, it is generally necessary to continue injecting the caustic agent foam into the high permeability areas. Cooling problems also fail to affect foam stability. This is because the foam will preferentially go into the hot, high permeability areas of the steam override zones. The cool areas of the formation are those areas of low permeability which the foam will avoid.

The following examples will further illustrate the novel steam foaming agents of the present invention. These examples are given by way of illustration and not as limitations on the scope of the invention. Thus, it should be understood that the composition and concentration of the foaming agents may be varied to achieve similar results within the scope of the invention.

EXAMPLES 1-4

FIG. 1 illustrates the substantial advantages in foam properties afforded by the addition of a caustic agent such as sodium carbonate to a steam foam mixture. The illustration graphs the foam resistance factor of several steam foams versus the lifetime of the foams in hours. The foam resistance factor and the lifetime of a foam are considered to be the two most important properties of a foam.

The foam resistance factor measures the tendency that a foam will have to divert steam into formation areas of lower permeability. The foam resistance factor is defined as the ratio of the steam mobility without foam to the steam mobility with foam. Since the steam mobility without foam will not change in the same core material, a higher foam resistance factor indicates a greater ability of the steam foam to divert steam into lower permeability regions of the formation and improve steam flood conformance.

The lifetime of a steam foam is also an important property. Ideally, one would want a steam foam that would maintain itself as a foam for the months or years of a steam flood. The longer a steam foam exists in the formation after injection, the more effective that steam foam will be in diverting steam into lower permeability formations and recovering greater amounts of hydrocarbons.

The foam resistance factors were measured by flooding core samples using the procedure of Examples 5-11. The injection pressures required to maintain fixed injection rates were measured and used along with known viscosity and density figures to calculate the relative mobilities and the foam resistance factor. Thus, the higher the injection pressure required to maintain a given injection rate of a steam foam, the higher the foam resistance factor was in that core.

All concentration percentages were based upon the weight of injected steam in the mixture. Volume in cubic feet was measured at one atmosphere and 60° F.

Example 1 was a foam mixture consisting of 5% of COR 180B based upon the weight of the 50% quality steam present. Example 2 consisted of 5% by weight COR 180B, 1980 cubic feet of nitrogen per barrel of steam and 50% quality steam. Example 3 employed a foam mixture identical to that of Example 2 except for the addition of 1% by weight sodium chloride. This example shows the improved foam properties available with the known addition of 1% of sodium chloride to a steam foam mixture. However, the steam foam died out after only three days and dropped below a foam resistance factor of 10 after only two days.

The substantial advantages of adding 1% sodium carbonate to a steam foam mixture is shown in the FIG. 1 graph of Example 4, wherein the steam foam mixture had a lifetime in excess of six days. When data collection ceased at the end of six days, Example 4 had a foam resistance factor that was as great as the foam resistance factor of Example 3 at the very start of injection. For the first three days, the foam resistance factor of Example 4 was approximately 5 to 10 times higher than Example 3. The only difference between the foam mixtures of Examples 3 and 4 is the invention addition in Example 4 of 1% by weight sodium carbonate.

EXAMPLES 5-11

Multiple core floods were run to show the effect of various steam foams on residual oil saturations, including several steam foams containing sodium carbonate. The results of the core floods done for Examples 5-11 are listed in Table 1. They indicate a substantial increase in oil recovery with the injection of steam foams containing sodium carbonate as a caustic agent.

The core floods were performed using a steel tube measuring 1"in diameter and 8" long. Kern River, Calif. formation material containing naturally saturated crude oil was packed into the steel tube to form a core. The tube was evacuated and deionized water was admitted into the tube. One pore volume corresponded to about 50 cubic centimeters of voidage. The core was installed in a constant temperature oven maintained at about 350° F. with a back-pressure of 100 psig on the outlet of the core.

Steam was first injected at a rate of 3.5 cc/min (of equivalent water) until no more oil was produced. This produced the residual oil saturation after steam flood in percent pore volume that is recorded in the first column of Table 1. The dilute steam foam (COR 180B) solution with or without sodium carbonate was injected into the core at a rate of 1.75 cc/min with 100 percent quality steam injected simultaneously at a rate of 1.75 cc/min to give a total injection of steam foam of 3.5 cc/min. The steam quality for the entire steam foam mixture was about 50%. The nitrogen was injected simultaneously with the steam and the foaming agent solution. After the injection of one pore volume (about 50 cc) of the steam foam solution, the injection of the foaming agent, caustic agent and nitrogen was terminated.

Steam injection was continued at the rate of 3.5 cc/min (of equivalent water) to simulate a steam flood after the injection of a steam foam. This later injection of steam was conducted during the daytime for a total of about eight hours. The cores were shut in overnight for 16 hours and oven temperature was maintained at 350° F. Steam injection was resumed on the following day. The change in injection pressure was continuously recorded. Steam injection was terminated when the injection pressure had decreased to the original injection pressure of the steam before the injection of the steam foam.

The same core was repeatedly used for different examples except when sodium carbonate was injected into the core. The use of the same core ensured the same residual oil saturation and the same core characteristics between examples. When a steam foaming agent was injected, a complete desorbtion of the foaming agent was obtained between core floods by flooding the core with 20 pore volumes of deionized water at room temperature. A new core was required after sodium carbonate injection because the wetability of the core was altered by sodium carbonate.

Table 1 illustrates the drastic improvements in oil recovery obtained with the coinjection of sodium carbonate with the steam foams in Examples 7-11. Residual oil saturation after the foam injection and a subsequent steam flood registered an improvement of 50-70%. Examples 5 and 6 show a residual oil saturation of about 30% after foam injection and a subsequent steam flood. With the addition of only 0.5% sodium carbonate in Example 7, the otherwise identical steam foam injection and subsequent steam flood of Example 7 cut the residual oil saturation in half from the 30% of Example 6 to the 16% of Example 7. When the coinjection of sodium carbonate was increased to 1% by weight as in Examples 8-10, residual oil saturation dropped even further to 9-11%.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

TABLE 1
EFFECT OF STEAM FOAMS ON RESIDUAL OIL SATURATIONS

| Ex. | Composition of Foam Mixture in 50% Quality Steam | Residual Oil After Steamflood % PV | Residual Oil After Foam Injection and Subsequent Steamflood % PV |
|---|---|---|---|
| 5 | COR 180B 5% | 37.1 | 29.9 |
|   |   | 33.0 | 31.7 |
|   |   | Avg. 35.1 | Avg. 30.8 |
| 6 | COR 180B 5% | 42.4 | 32.2 |
|   | $N_2$ 1980 CU FT/BBL STEAM | 44.2 | 27.9 |
|   |   | Avg. 43.3 | Avg. 30.1 |
| 7 | COR 180B 5% $Na_2CO_3$ 0.5% $N_2$ 1980 CU FT/BBL STEAM | 30.5 | 15.8 |
| 8 | COR 180B 5% $Na_2CO_3$ 1% $N_2$ 1980 CU FT/BBL STEAM | 35.3 | 9.7 |
|   |   | 23.0 | 8.4 |
|   |   | Avg. 29.2 | Avg. 9.1 |
| 9 | COR 180B 5% $Na_2CO_3$ 2% $N_2$ 1980 CU FT/BBL STEAM | 29.4 | 9.9 |
|   |   | 25.1 | 12.1 |
|   |   | Avg. 27.3 | Avg. 11.0 |
| 10 | COR 180B 5% $Na_2CO_3$ 1% $N_2$ 2470 CU FT/BBL STEAM | 27.1 | 8.9 |
| 11 | COR 180B 5% $Na_2CO_3$ 1% $N_2$ 1480 CU FT/BBL STEAM | 28.3 | 16.7 |

REMARKS:
1. Volume of nitrogen measured at 1 atmosphere and 60° F.
2. Concentration of chemicals measured by weight corresponding to the wet steam injected.

What is claimed is:

1. A process for recovering hydrocarbons from an underground hydrocarbon formation penetrated by at least one injection well and at least one production well, which comprises:

injecting into an injection well a mixture of steam, about 5 cubic feet to about 10,000 cubic feet of a noncondensable gas per barrel of steam in the injected mixture, about 0.01% to about 10% by weight of a foaming agent based upon the weight of the steam in the injected mixture, and about 0.01% to about 10% of a caustic agent based upon the weight of steam in the injected mixture, said caustic agent selected from the group consisting of sodium carbonate, sodium bicarbonate, potassium carbonate, sodium hydroxide, potassium hydroxide, ammonium hydroxide, sodium silicate, and sodium orthosilicate; and recovering hydrocarbons and other fluids from a production well.

2. The process of claim 1 for recovering hydrocarbons, wherein said mixture is injected into a steam override zone.

3. The process of claim 1, further comprising the injection of steam into the injection well prior to the injection of said mixture.

4. The process of claim 1, further comprising the injection of steam into the injection well after the injection of said mixture.

5. The process of claim 4, further comprising:
injecting the steam for a minimum of seven days after the injection of said mixture; and
repeating the injection of said mixture followed by the injection of steam.

6. The process of claim 1, wherein the caustic agent injected into the injection well is a mixture of said caustic agents.

7. The process of claim 1 for recovering hydrocarbons, wherein the concentration of said foaming agent in steam is increased as the steam injection rate is increased.

8. The process of claim 1 for recovering hydrocarbons, wherein the non-condensable gas is selected from the group consisting of nitrogen, carbon dioxide, air, methane, ethane, flue gas, and mixtures thereof.

9. The process of claim 1 for recovering hydrocarbons, wherein said mixture is injected into an injection well near the beginning of steam injection.

10. The process of claim 1 for recovering hydrocarbons, wherein said mixture is injected into an injection well immediately prior to steam breakthrough at a production well.

11. The process of claim 1 for recovering hydrocarbons, wherein said mixture is injected into an injection well after steam breakthrough at a production well.

12. The process of claim 1 for recovering hydrocarbons, wherein the non-condensable gas is injected at a rate of about 10 to about 2000 cubic feet per barrel of steam in the injected mixture.

13. The process of claim 1, wherein the foaming agent is injected at a rate of about 0.05% to about 5% by weight of steam in the injected mixture.

14. The process of claim 1, wherein the caustic agent is injected at a rate of about 0.05% to about 2% by weight of steam in the injected mixture.

15. A process for recovering hydrocarbons from an underground hydrocarbon formation penetrated by at least one injection well and at least one production well, which comprises:
injecting into an injection well a mixture of steam, about 10 cubic feet to about 2000 cubic feet of nitrogen per barrel of steam in the injected mixture, about 0.05% to about 5% by weight of a foaming agent based upon the weight of the steam in the injected mixture, and about 0.05% to about 2% of sodium carbonate based upon the weight of steam in the injected mixture; and
recovering hydrocarbons and other fluids from a production well.

16. A process for recovering hydrocarbons using a cyclic steam process from an underground hydrocarbon formation penetrated by at least one well, which comprises:
injecting into a well a mixture of steam, about 5 cubic feet to about 10,000 cubic feet of a non-condensable gas per barrel of steam in the injected mixture, about 0.01% to about 10% by weight of a foaming agent based upon the weight of the steam in the injected mixture, and about 0.01% to about 10% of a caustic agent based upon the weight of steam in the injected mixture, said caustic agent selected from the group consisting of sodium carbonate, sodium bicarbonate, potassium carbonate, sodium hydroxide, potassium hydroxide, ammonium hydroxide, sodium silicate, and sodium orthosilicate;
shutting in the well for a period of at least 1 day; and
producing the well to recover hydrocarbons and other fluids.

17. The process of claim 16, further comprising injecting steam into the well prior to the injection of said mixture.

18. The process of claim 16, further comprising the injection of steam into the well after the injection of said mixture and before shutting in the well.

19. A process for recovering hydrocarbons from an underground hydrocarbon formation penetrated by at least one injection well and at least one production well, which comprises:
injecting steam into an injection well;
injecting into a production well a mixture of steam, about 5 cubic feet to about 10,000 cubic feet of a non-condensable gas per barrel of steam in the injected mixture, about 0.01% to about 10% by weight of a foaming agent based upon the weight of the steam in the injected mixture, and about 0.01% to about 10% of a caustic agent based upon the weight of steam in the injected mixture, said caustic agent selected from the group consisting of sodium carbonate, sodium bicarbonate, potassium carbonate, sodium hydroxide, potassium hydroxide, ammonium hydroxide, sodium silicate, and sodium orthosilicate; and
recovering hydrocarbons and other fluids from the production well.

20. The process of claim 19, further comprising the injection of said mixture into the injection well prior to the injection of steam into the injection well.

21. The process of claim 19, further comprising the injection of said mixture into the injection well after the injection of steam into the injection well.

* * * * *